United States Patent
Aulick et al.

(10) Patent No.: US 6,500,375 B1
(45) Date of Patent: Dec. 31, 2002

(54) FABRICATION OF SEAMLESS TUBE

(75) Inventors: Larry Oral Aulick, Cynthiana, KY (US); Robert Glenn Smith, Georgetown, KY (US); Mark Stephen Weisman, Jr., Lexington, KY (US)

(73) Assignee: Lexmark International Inc., Lexington, KY (US)

( * ) Notice: Subject to any disclaimer, the term of this patent is extended or adjusted under 35 U.S.C. 154(b) by 0 days.

(21) Appl. No.: 09/519,308

(22) Filed: Mar. 6, 2000

(51) Int. Cl.[7] .................. B29C 41/10; B29C 41/12; B32B 1/32
(52) U.S. Cl. .................. 264/236; 264/308; 264/310; 264/312; 118/107; 118/118
(58) Field of Search .................. 264/308, 310, 264/312, 236; 118/107, 118; 427/356

(56) References Cited

U.S. PATENT DOCUMENTS

| | | | |
|---|---|---|---|
| 4,158,586 A | * | 6/1979 | Usui .................. 156/175 |
| 4,405,550 A | | 9/1983 | Hungerford |
| 4,581,264 A | | 4/1986 | Emery et al. |
| 4,644,900 A | * | 2/1987 | Poterala .................. 118/670 |
| 4,747,992 A | * | 5/1988 | Sypula et al. .................. 264/130 |
| 5,039,598 A | | 8/1991 | Abramsohn et al. |
| 5,156,888 A | * | 10/1992 | Haubs et al. .................. 427/163 |
| 5,338,826 A | | 8/1994 | St. Clair et al. |
| 5,433,913 A | | 7/1995 | Kawauchi et al. |
| 5,481,191 A | * | 1/1996 | Rzedzian .................. 324/318 |
| 5,578,096 A | * | 11/1996 | Christianson et al. .................. 51/295 |
| 5,582,886 A | | 12/1996 | Kitajima et al. |
| 5,589,111 A | | 12/1996 | Haruta et al. |
| 5,630,806 A | * | 5/1997 | Inagaki et al. .................. 604/282 |
| 5,759,655 A | | 6/1998 | Kitajima et al. |
| 5,871,818 A | | 2/1999 | Button et al. |
| 5,888,436 A | * | 3/1999 | Keith et al. .................. 264/103 |
| 6,217,963 B1 | * | 4/2001 | Miyamoto et al. .................. 428/36.91 |

* cited by examiner

Primary Examiner—Stefan Staicovici
(74) Attorney, Agent, or Firm—John A. Brady

(57) ABSTRACT

To make a seamless tube of polyimide, an amount of polyamic acid precursor to constitute the final tube is applied eveny as a solution to a cylindrical mandrel. The mandrel is rotated while a canted doctor blade smoothes the solution. The solvent is then expelled and the remaining precursor cured by heat.

1 Claim, 1 Drawing Sheet

FABRICATION OF SEAMLESS TUBE

TECHNICAL FIELD

This invention relates to the manufacture of seamless tubes of polymers, such as polyimides.

BACKGROUND OF THE INVENTION

The fabrication of a seamless polyimide tube has been discussed in patent literature in recent years. U.S. Pat. No. 5,433,913 to Kawauchi et al. serves as an example. It employs a ring coating process coupled with ultrahigh viscosity coating solutions.

High performance polyimides are very difficult to process. They are thermosetting resins, which cannot be reformed with heat. Furthermore, they are soluble in a limited number of relatively high-boiling solvents, such as n-methyl-2-pyrrolidone (NMP) and dimethyl acetamine] (DMAc). Curing conditions for polyimides are difficult to optimize and have a profound effect on the mechanical properties of the cured film. Additionally, the high temperatures required for polyimide curing limit the choice of coating substrates to metal and ceramics. Finally, the cost of polyamic acid resins is high, giving great advantage to a process which can minimize resin waste.

This invention is a process by which a seamless polyimide tube can be cast from a high viscosity polyamic acid resin. The process is simple, effective, relatively fast, and highly efficient in that minimal waste material is generated.

DISCLOSURE OF THE INVENTION

In accordance with this invention, the amount of resin to constitute the final tube is computed and an amount of solution having that amount precursor for that amount of resin is defined. That amount of solution is applied generally evenly over a mandrel. The solution may be forced from a nozzle or simply poured. The mandrel is rotated while a doctor blade, canted to keep material form of the doctor blade, is moved along the length of the mandrel at a amount of separation from the mandrel consistent with the predetermined thickness which the final tube is to have. After the doctoring step, the solvent is extracted with heat. The film is further cured to form the polyimide resin and then removed from the mandrel.

BRIEF DESCRIPTION OF THE DRAWINGS

The details of this invention will be described in connection with the accompanying drawings, in which.

DESCRIPTION OF THE PREFERRED EMBODIMENT

Figure 1:
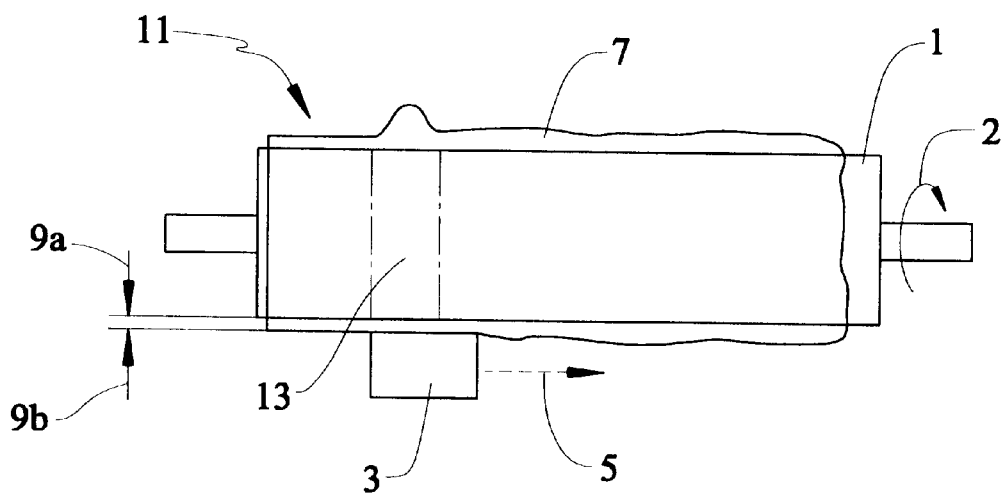
FIG. 1 is a top view and FIG. 2 is a side view of the doctoring action in midprocess.

The precursor used in this invention is a polyamic acid solution comprised of the copolymer of biphenyl tetracarboxylic dianhydride (BPDA) and p-phenylenediamine (pPDA). The solvent preferably is DMAc, although NMP is useful alternatively, and any comparable solvent is consistent with this invention. The solution may be 15 weight percent (i.e., 15 grams of monomer per 100 grams of total solution weight). Boron nitride can optionally be compounded with the resins to increase thermal conductivity.

The viscosity of the polyamic resins preferably may be between 10,000 cP and 100,000 cP, with particular preference at 50,000 cP. Optionally, numerous combinations of dianhydrides and diamines can be used. The most preferred combination of monomer and solvents are specified in the foregoing have been selected for the high mechanical and thermal properties obtained. The key solution parameters, from a processing standpoint, are obtaining a high viscosity in the coating solution and maintaining control of the percent solids of the solution. Below 10,000 cP, the solution does not have the mechanical stability to maintain a shape at room temperature, leading to poor thickness uniformity. Above 100,000 cP, the solution is so thick that air bubbles cannot be easily removed from the solution, giving rise to coating defects.

Once the foregoing solution of polyamic acid resin is synthesized, it is degassed under a vacuum for a period of time until no escaping bubbles are seen. The solution can then be drawn into a syringe, which has a large orifice. By knowing what dimensions are desired for the polyimide tube, the amount of solution required is readily determined. For example, if the tube of 50 microns thickness, 25.4 mm inner diameter, and 250 mm length is to be manufactured, the volume of material needed is 0.005 cm×2.54 cm×25.0 cm, which equals 0.997 cubic cm. Given a polyimide density of 2.5 gr/cubic cm, 2.49 gr of polyimide will be in the final tube. An amount of solution containing that amount of polyimide is used in accordance with this invention. Since the starting solution percent solids is 15%, 16.6 gr of solution will be used. Thus, this amount of resin is transferred to the syringe. Since the edges of the tube typically require trimming, a small excess of material may be employed, limited to an amount of solids that will be trimmed.

Coating is on a cylindrical mandrel 1. The mandrel is an aluminum cylinder of 25.2 mm outer diameter The surface is highly polished to a near mirror surface. The surface is treated with a thin coating of silicon dioxide (not separately illustrated), which can be applied by a sputter coating process. Typical coating thicknesses of the silicon dioxide range from 0.5 to 2 microns. It is important to note that the mandrel must be straight and concentric about its centers. Any deviation from straightness and roundness leads to thickness variation in the final part. A tolerance of 1 mil on the concentricity appears to be sufficient for achieving thickness uniformity. The mandrel is mounted on a lathe (not shown) or similar equipment capable of rotating the mandrel as shown by arrow 2. While rotation is typically horizontal, no reason appears why the process of this invention would not function in a vertical direction of rotation.

The mandrel 1 is rotated at a suitable rate, such as 60 rpm or 181 rpm. At this point, the syringe (not shown) is brought into close proximity to the mandrel. While the mandrel 1 is rotating, the amic acid resin solution is dispensed onto the mandrel surface in a consistent manner so as to spread the material as evenly as possible across the mandrel surface. In a mass production setting this can readily be done at a fixed rate by equipment which operates the singe while traversing the part at a speed which corresponds to the amount of solution being dispensed. This step is to cover the surface of the mandrel with a generally disposed solution in correct quantity to make a polyimide tube of the correct thickness. equipment which operates the syringe while traversing the part at a speed which corresponds to the amount of solution being dispensed. This step is to cover the surface of the mandrel with a generally dispersed solution in correct quantity to make a polyimide tube of the correct thickness.

The syringe is then moved away and the mandrel 1 is maintained at the rotational rate. A blade 3 is then brought to a specified distance from the mandrel. A blade 3 of 1 mm thickness with flat or sharp edge functions well it is believed that a blade 3 can have a wide range of configurations and function well. The shape, material, and orientation of the blade are vital to the process. A steel blade coated with a thin layer of TEFLON fluoropolymer is preferred. The blade is positioned normal to the axis of rotation of the mandrel FIG. 1 is a top view and FIG. 2 is a side view of system during the process.

A blade 3 is moved along the mandrel parallel to the axis of the mandrel in the direction of arrow 5, which doctors the resin solution on a mandrel surface 7 to a uniform thickness illustrated by spaced arrows 9a and 9b. The rate of translation in the direction of arrow 5 can be varied. Rates of 10 cm/min and faster are known to give tubes of uniform thickness.

Figure 2:
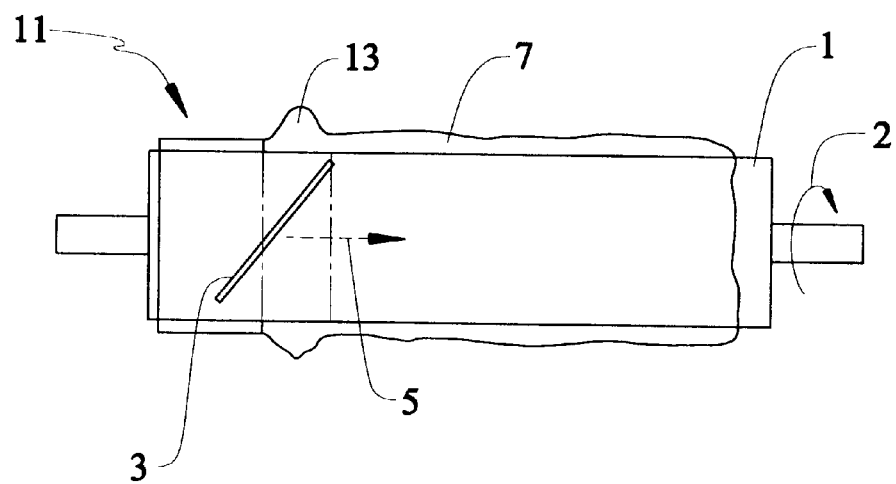

The doctor coating 11 is on the left of a blade 3 in FIG. 1 and FIG. 2. The incline of a blade 3 is essential to its function. If the blade is simply perpendicular from the direction of arrow 5 (the direction of travel), material is pushed along the mandrel surface until excess buildup creeps over the side of the blade and causes defects on the trailing side of the blade. With the incline, excess material buildup is not in the shape of a taurus, but rather a cone 13. As this buildup grows, it is knocked back onto the side of the leading edge of the blade Thus, no excess is transferred to the trailing edge and no defects are generated.

The distance between the blade and the mandrel surface is found preliminarily from the desired thickness of the polyimide tube, the percent solids of the of the coating resin as described in the foregoing. Typically, however, the distance must be increased over this estimate because the precursor solution does not shear sharply as a solid material would. Rather, due to it surface tension and viscosity, the precusor solution parts film the blade with a small radius or meniscus. Thus, the coating thickness is typically less than the distance between the mandrel and blade. The increased distance to compensate for this is best determined empirically. Once the proper overall distance of the doctor blade to the mandrel is established, polyimide tube thicknesses are highly reproducible so long as blade distance and coating solution viscosity and percent solids are kept constant. For a coating solution as described in the foregoing with 15% solids and 50,000 cP, a blade distance of 33 mils consistently provides a final polyimide tube of 45 microns in thickness.

After applying and doctoring the polyamic acid resin onto the mandrel, the coated mandrel is removed from the lathe. It is then transferred to an oven for evaporation of the solvent. This may be for 1 hour at 125 degrees C. Upon evaporation of the solvent, the mandrel is transferred to an oven set to 200 degrees C. The mandrel and coating are held at this temperature for 2 hours. The temperature is then increased to 250 degrees C. and held for 2 additional hours. Finally, the oven temperature is increased to 380 degrees C. and held for one hour. This baking process has been shown to effectively eliminate solvents and to polymerize the polyamic acid to give a polyimide tube of sound mechanical properties. However, the curing schedule must be optimized empirically for any coating thickness, viscosity, percent solids, solvent, and monomer combination used, as this process is highly dependent on solvent level and type, temperature, and similar factors.

Upon final cure of the polyimide film, the mandrel is removed from the oven and allowed to equilibrate to room temperature. If the film has been cast at a uniform thickness and if the silicon dioxide coating is also uniform, no preferential adhesion to the mandrel should occur and the tube should be round and free of wrinkles. Because of the difference in thermal expansion between the aluminum core of the mandrel and the polyimide film, there should be a small gap between the mandrel outer surface and polyimide inner surface. Therefore, removal of the film is a trivial matter of simply sliding the part off the mandrel.

The advantages of this process over existing processes include high speed—a part can be coated in 2 minutes or less. In fact, it is feasible that multiple parts could be coated on the same equipment, giving very high yield. Additionally the desired coating thickness can be achieved in one coating pass, eliminating additional drying steps that would be required for multiple pass/dip methods. Furthermore, the process can provide tubes of high thickness uniformity. Samples have been made at +/–5 microns, using a mandrel that is rated for concentricity of 5 mils. A mandrel of 1 mil concentricity or better should bring the thickness uniformity to within +/–2 microns. And finally, very little waste material is generated. By dispensing a fixed and controlled amount of resin on to the mandrel surface, less than 1 ml of waste per part has been generated. This can be contrasted to a vertical dip or ring coating process in which a large amount of coating resin must be generated to coat mandrels. The potential yield for coating resin with this process is significantly greater. Thus, by increasing throughput and minimizing material waste while maintaining polyimide tube quality, a significant cost saving can be expected for this process over existing processes.

It will be clear that many of the materials used as described above may be replaced by comparable materials so long as the coating of a mandrel with a solution containing the amount of resin for final thickness is achieved. Accordingly, patent coverage should be as provided by law, with particular reference to the accompanying claims.

We claim:

1. A process of making a polyimide tube comprising the steps of coating a cylindrical mandrel having a longitudinal axis with a solution of polyamic acid in a solvent, said solution containing an amount of polyamic acid which is not greater than the amount of polyamic acid to form said polyimide tube, rotating said mandrel while doctoring said solution to form a uniform coating of generally the same length as said polyimide tube, said doctoring being by a blade moved along said mandrel while the body of said blade is inclined with respect to said longitudinal axis to direct excess of said solution toward the leading edge of said blade, with no excess of said solution being transferred to the trailing edge of said blade, and then, without addition of any further polyamic acid coating, driving off said solvent to leave said polyamic acid on said mandrel in generally the form of said polyimide tube, and then curing said polyamic acid to cure said polyamic acid to a polyimide to complete said polyimide tube.

* * * * *